(12) United States Patent
Cervi

(10) Patent No.: US 12,509,902 B2
(45) Date of Patent: Dec. 30, 2025

(54) PNEUMATIC TELESCOPIC MAST

(71) Applicant: FIRECO S.R.L. A SOCIO UNICO, Gussago (IT)

(72) Inventor: Corrado Cervi, Rovato (IT)

(73) Assignee: FIRECO S.R.L. A SOCIO UNICO, Gussago (IT)

( * ) Notice: Subject to any disclaimer, the term of this patent is extended or adjusted under 35 U.S.C. 154(b) by 228 days.

(21) Appl. No.: 18/012,925

(22) PCT Filed: Jul. 3, 2020

(86) PCT No.: PCT/IT2020/000052
§ 371 (c)(1),
(2) Date: Dec. 25, 2022

(87) PCT Pub. No.: WO2022/003736
PCT Pub. Date: Jan. 6, 2022

(65) Prior Publication Data
US 2023/0265673 A1     Aug. 24, 2023

(51) Int. Cl.
*E04H 12/18*     (2006.01)

(52) U.S. Cl.
CPC ................ *E04H 12/182* (2013.01)

(58) Field of Classification Search
CPC ..... E04H 12/18; E04H 12/182; E04H 12/185; E04H 12/34; H01Q 1/1235; H01Q 1/10;
(Continued)

(56) References Cited

U.S. PATENT DOCUMENTS 3,738,075 A * 6/1973 Nansel .................. B66C 23/708
212/292
4,027,802 A * 6/1977 Reynolds ............ E04F 21/1816
52/118

(Continued)

FOREIGN PATENT DOCUMENTS

DE     2454271 A1    6/1975
WO   2011163585 A1   12/2011

OTHER PUBLICATIONS

International Search Report, issued in PCT/IT2020/000052, mailed Apr. 12, 2021, Rijswijk, NL.

*Primary Examiner* — Kyle J. Walraed-Sullivan
(74) *Attorney, Agent, or Firm* — ArentFox Schiff LLP; Michael Fainberg

(57) ABSTRACT

A pneumatic telescoping mast having a plurality of telescopically-coupled sealing tubes is provided. Actuation of the telescopically-coupled sealing tubes occurs by introducing pressurized air into the pneumatic telescoping mast. Tube locking means lock the telescopically-coupled sealing tubes in an extended configuration by interference or friction even in absence of the pressurized air in the pneumatic telescoping mast. The tube locking means have at least one safety device configured to keep the tube locking means in a locked position, the at least one safety device being deactivatable to allow the tube locking means to switch to a released position only when air in the pneumatic telescoping mast reaches a preset pressure value. The pneumatic telescoping mast is suitable for supporting and moving military communication, lighting and/or surveillance equipment.

7 Claims, 13 Drawing Sheets

(58) Field of Classification Search
CPC ........ H01Q 1/103; H01Q 1/106; F21V 21/22;
B60Q 1/2657; F16B 7/105
USPC .................................. 52/118, 115; 349/902
See application file for complete search history.

(56) References Cited

U.S. PATENT DOCUMENTS

| | | | | |
|---|---|---|---|---|
| 4,137,535 | A * | 1/1979 | Rupprecht | H01Q 1/10 52/118 |
| 4,254,423 | A * | 3/1981 | Reinhard | E04H 12/18 52/118 |
| 4,594,824 | A * | 6/1986 | Ziegler | F21V 21/22 52/118 |
| 4,663,900 | A * | 5/1987 | Rehm | H01Q 1/10 212/292 |
| 4,815,757 | A * | 3/1989 | Hamilton | B60S 9/06 348/148 |
| 4,913,458 | A * | 4/1990 | Hamilton | B60S 9/10 348/148 |
| 4,918,896 | A * | 4/1990 | Wiese | E04H 12/182 52/632 |
| 5,163,650 | A * | 11/1992 | Adams | E04H 12/182 248/405 |
| 5,333,422 | A * | 8/1994 | Warren | E04H 12/182 52/118 |
| 5,572,837 | A * | 11/1996 | Featherstone | B60Q 1/2657 52/118 |
| 5,718,087 | A * | 2/1998 | Featherstone | E04H 12/182 52/118 |
| 5,743,635 | A * | 4/1998 | Hulse | E04H 12/182 362/385 |
| 5,850,713 | A * | 12/1998 | Hojo | H01Q 1/1235 52/118 |
| 6,046,706 | A * | 4/2000 | Vargas | H01Q 1/1235 343/903 |
| 6,299,336 | B1 * | 10/2001 | Hulse | B60Q 1/2657 362/198 |
| 6,343,568 | B1 * | 2/2002 | McClasky | A01K 31/14 119/428 |
| 7,497,140 | B2 * | 3/2009 | Blackwelder | F16H 25/2056 52/118 |
| 7,574,832 | B1 * | 8/2009 | Lieberman | E04H 12/182 52/118 |
| 7,788,858 | B1 * | 9/2010 | Ammons | B66C 23/44 212/292 |
| 7,966,777 | B2 * | 6/2011 | Douglas | E04H 12/182 52/118 |
| 9,702,162 | B2 * | 7/2017 | Ceko | E04H 12/24 |
| 11,952,977 | B1 * | 4/2024 | Gehring | E04H 12/182 |
| 2003/0095411 | A1 * | 5/2003 | Blackwelder | F21V 21/22 362/418 |
| 2006/0028390 | A1 * | 2/2006 | Norwood | H01Q 1/1235 343/874 |
| 2008/0180349 | A1 * | 7/2008 | Newman | E04H 12/182 343/890 |
| 2009/0145056 | A1 * | 6/2009 | Pereira | E04H 12/182 52/111 |
| 2011/0101716 | A1 * | 5/2011 | Nolte | F16B 7/105 294/174 |
| 2012/0011804 | A1 * | 1/2012 | Winterhalter | E04H 12/02 29/419.1 |
| 2012/0079778 | A1 * | 4/2012 | Wasson | H01Q 1/1235 52/111 |
| 2012/0189376 | A1 * | 7/2012 | Kardohely | H01Q 1/1235 403/109.1 |
| 2013/0039049 | A1 * | 2/2013 | Jones | F21V 21/15 362/184 |
| 2013/0091784 | A1 * | 4/2013 | Schmidt | F03D 80/88 52/115 |
| 2014/0285005 | A1 * | 9/2014 | Casteel | H02S 10/40 320/101 |
| 2014/0370935 | A1 * | 12/2014 | Newman | H01Q 1/246 455/562.1 |
| 2015/0023017 | A1 * | 1/2015 | Smith | F21L 13/00 362/249.03 |
| 2016/0301128 | A1 * | 10/2016 | Blackwelder | H01Q 1/103 |
| 2017/0130753 | A1 * | 5/2017 | Kemp | F16B 7/105 |
| 2019/0245260 | A1 * | 8/2019 | Dominguez | H01Q 1/3216 |
| 2019/0368216 | A1 * | 12/2019 | Young | F16B 7/105 |
| 2020/0240578 | A1 * | 7/2020 | Chen | F16M 11/2021 |
| 2022/0112911 | A1 * | 4/2022 | Simon | E04H 12/08 |
| 2023/0108329 | A1 * | 4/2023 | Strippoli | F16B 7/105 52/115 |
| 2024/0252861 | A1 * | 8/2024 | Sandmann | A62C 3/07 |

* cited by examiner

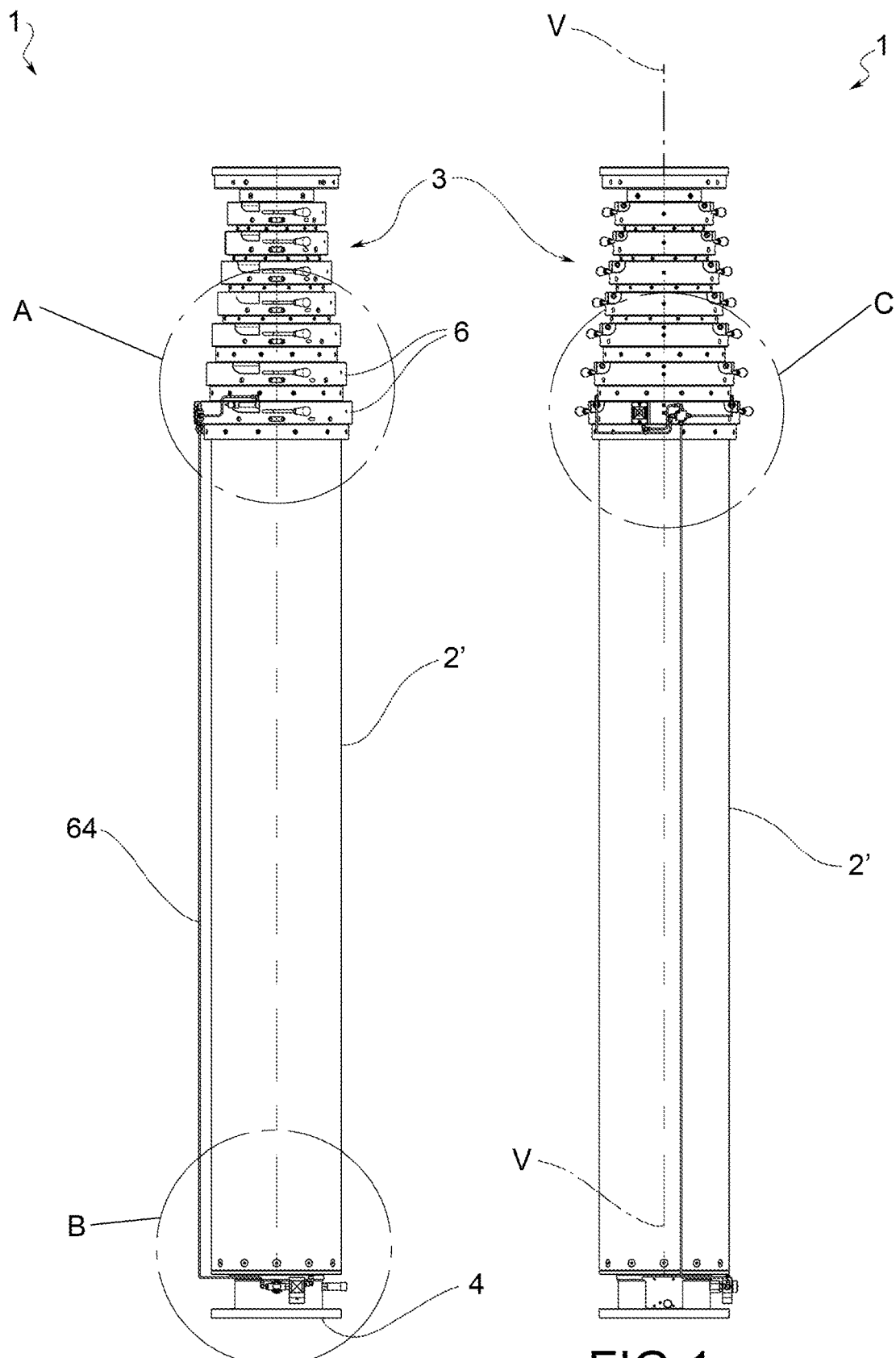

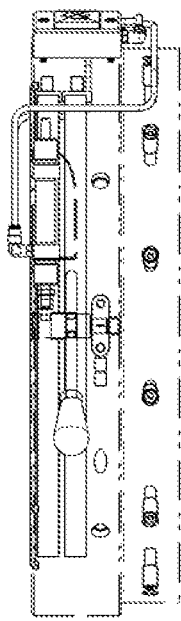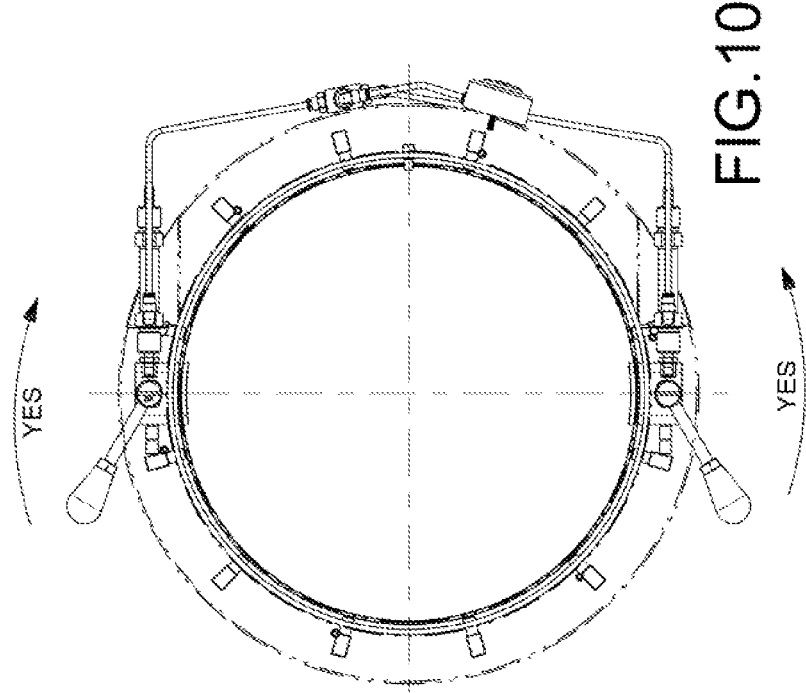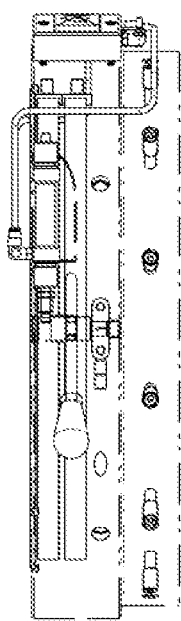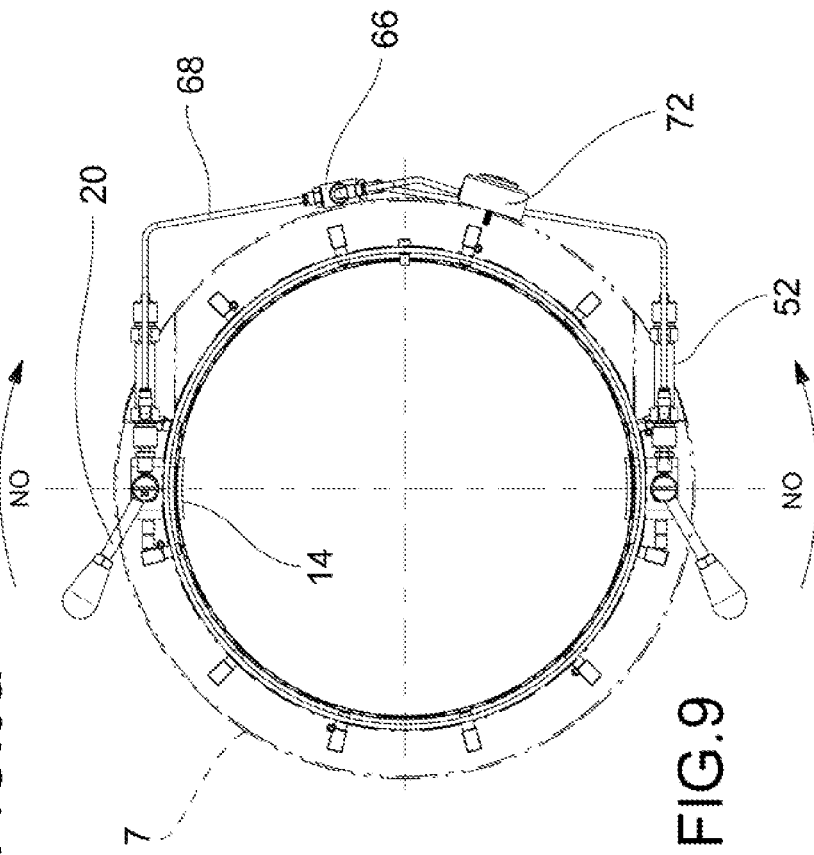

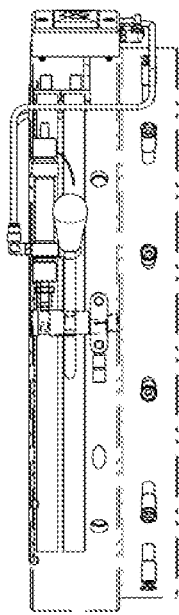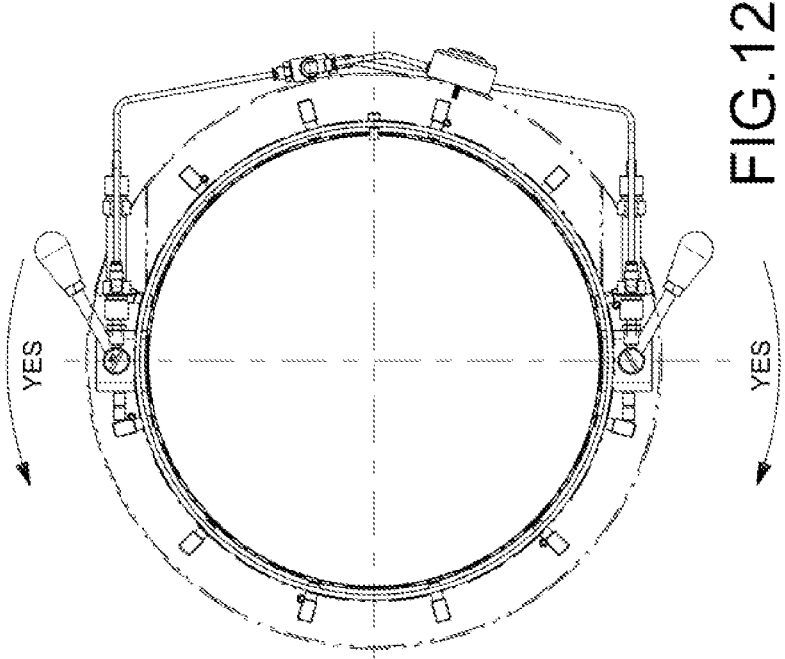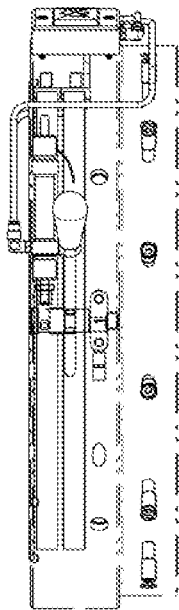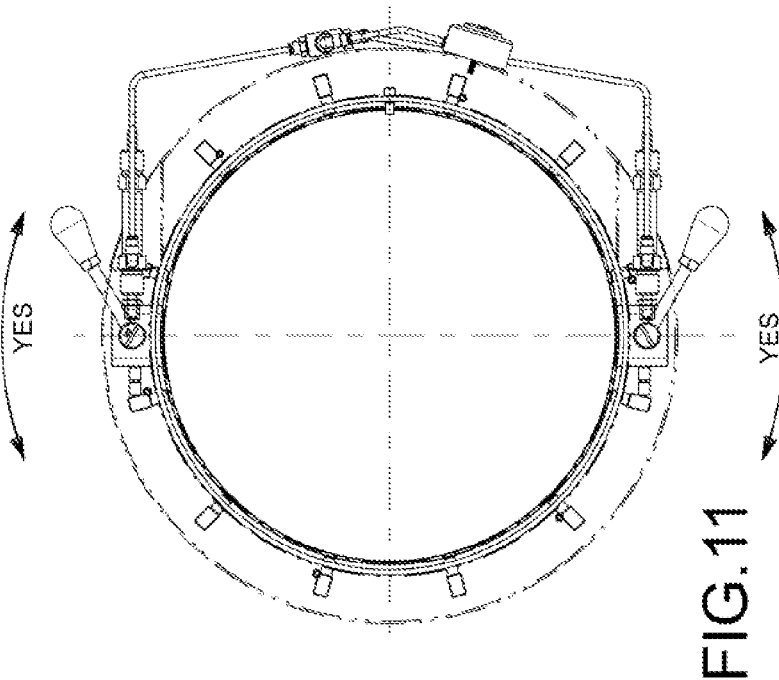

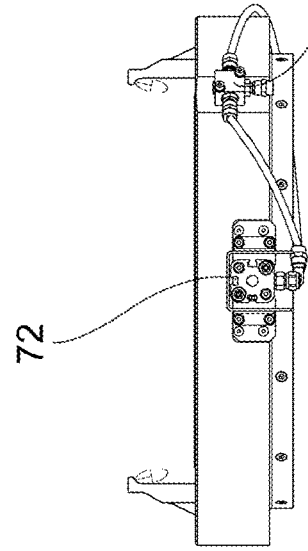
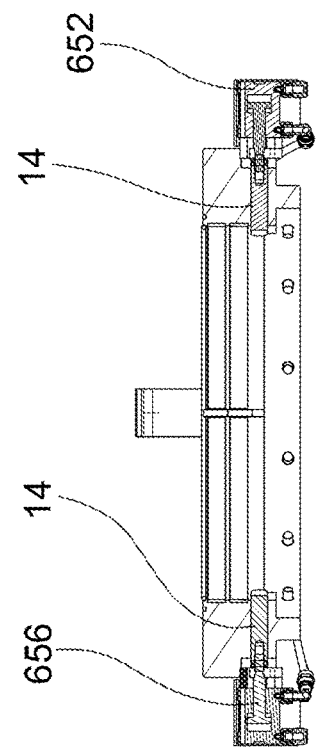
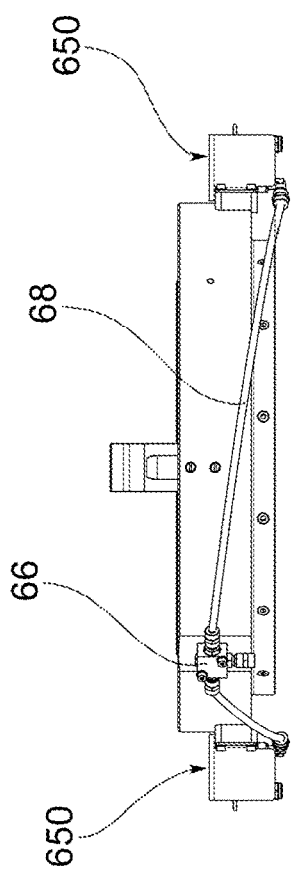
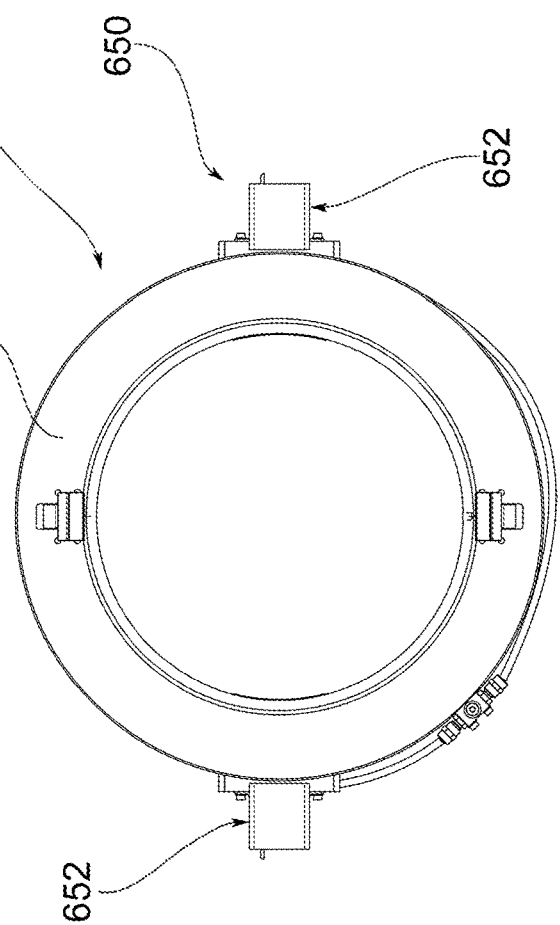

PNEUMATIC TELESCOPIC MAST

CROSS-REFERENCE TO RELATED
APPLICATIONS

This application is a National Phase Application of PCT International Application No. PCT/IT2020/000052, having an International Filing Date of Jul. 3, 2020 the contents of which are incorporated by reference in their entirety.

FIELD OF THE INVENTION

The present invention relates to a pneumatic telescoping mast, for example for supporting and moving military communication, lighting and/or surveillance equipment.

BACKGROUND OF THE INVENTION

As is known, a pneumatic telescoping mast consists of a plurality of telescopically-coupled sealing tubes, also known as "sections". The tubes are operable to switch from a retracted configuration to an extended configuration, and vice versa. The actuation of the tubes occurs by introducing pressurized air into the pneumatic telescoping mast.

Certain types of telescoping masts, to which the present disclosure refers, are provided with locking systems of the extended tubes so that the masts may remain extended even in the absence of pressurized air therein. These locking systems usually operate by interference or friction so as to make the sections integral with one another.

A drawback of this type of pneumatic telescoping masts lies in the fact that an inexperienced or distracted operator could run the risk of opening the locking systems—when the mast is extended—without using the preventive measures described in the instruction and maintenance manual. The condition that most frequently occurs is that of deactivating a locking device—generally that which is integral with the fixed lower tube—without having pressurized the mast itself beforehand. It is apparent that such a circumstance can be highly dangerous and should be avoided.

SUMMARY OF THE INVENTION

It is the object of the present invention to provide a pneumatic telescoping mast capable of obviating such a drawback. Other examples of pneumatic telescoping masts are disclosed in WO 2011/163585 A1 and DE 2454271 A1.

Such an object is achieved by a pneumatic telescoping mast as described and claimed herein. The idea at the basis of the present invention if that of preventing the deactivation of one or more locking devices of the tubes until the air in the mast reaches a preset pressure level.

The pneumatic telescoping mast of the present invention comprises a plurality of telescopically-coupled sealing tubes. The tubes are operable to switch from a retracted configuration to an extended configuration, and vice versa. The actuation of the tubes occurs by introducing pressurized air into the pneumatic telescoping mast. The mast is provided with tube locking means suitable to lock the tubes in the extended configuration by interference or friction even in the absence of pressurized air in the mast. The locking means comprise at least one safety device deactivatable to allow the movement of at least two tubes from the extended configuration to the retracted configuration only when the air in the mast reaches a preset pressure value.

In an embodiment, the safety device is operable by the pressurized air in the telescoping mast.

In an embodiment, the locking means associated with an outer tube comprise a latch supported by the outer tube and radially movable between an inactive retracted position and an active advanced position, in which it engages a latch seat obtained in at least one inner tube received in the outer tube.

In an embodiment, the movement of the latch is caused by the actuation of a manual control member operatively connected to the latch. The locking device comprises a single acting actuator normally biased by an elastic element to prevent the actuation of the control member and operable by the pressurized air in the mast to be disengaged from the control member.

For example, the manual control member comprises an eccentric pin which is integral with a control lever and engages a slot of the latch, a locking hole being obtained in the eccentric pin, engageable by a stem of the single acting actuator to lock the rotation of the eccentric pin.

In a variant, the movement of the latch is caused by an actuating actuator which is operable with a pressurized fluid to bring the latch from the active advanced position to the inactive retracted position.

In an embodiment, the actuating actuator is a pneumatic actuator which is operable by the pressurized air in the mast.

In a variant, the mast comprises a pressure switch suitable to detect the pressure value of the air in the mast, the actuating actuator being operable by a driving circuit which powers the actuating actuator when the pressure switch detects the reaching of the preset pressure value.

In an embodiment, the plurality of tubes of the mast comprises a fixed base tube, at least one locking device being supported by a locking ring fastened close to the upper end of the fixed base tube.

BRIEF DESCRIPTION OF THE DRAWINGS

In any case, further features and advantages of the pneumatic telescoping mast according to the invention will become apparent from the following description of preferred embodiments thereof, given only by way of non-limiting, indicative example, with reference to the accompanying drawings, in which:

FIGS. 1 and 1a are two elevation views of the pneumatic telescoping mast according to the invention, in one embodiment, in retracted position;

FIG. 4 is an enlarged view of the detail C circled in FIG. 1a;

FIGS. 9 to 12 and 9a to 12a show a plan and elevation view, respectively, of just as many locking rings in just as many operating configurations;

FIG. 15 is a top plan view of the locking ring in FIG. 14;

FIGS. 16 and 16a are two elevation views of the locking ring;

FIG. 17 is an axial cross section of the locking ring; and

DETAILED DESCRIPTION

Figure 4:
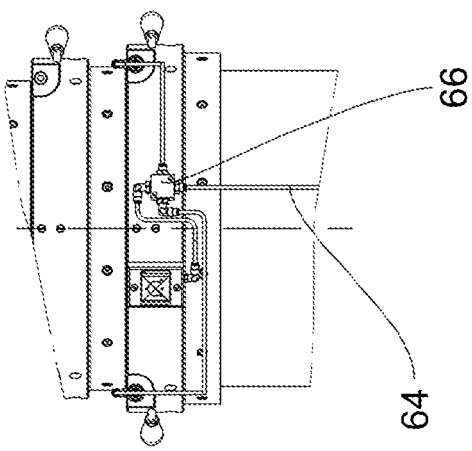
Figure 3:
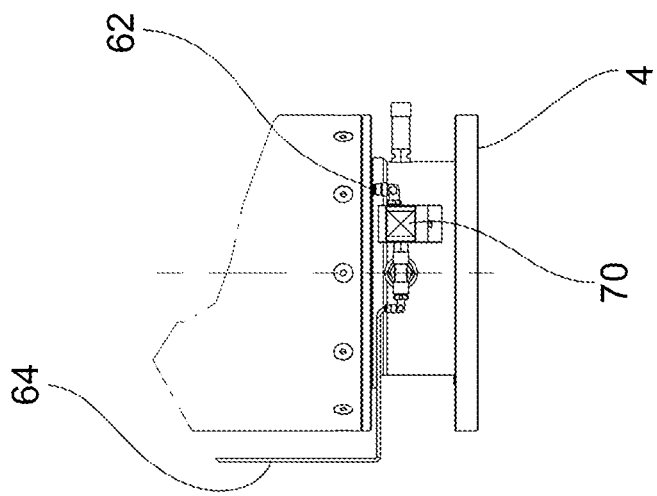
FIG. 3 is an enlarged view of the detail B circled in FIG. 1.
Figure 2:
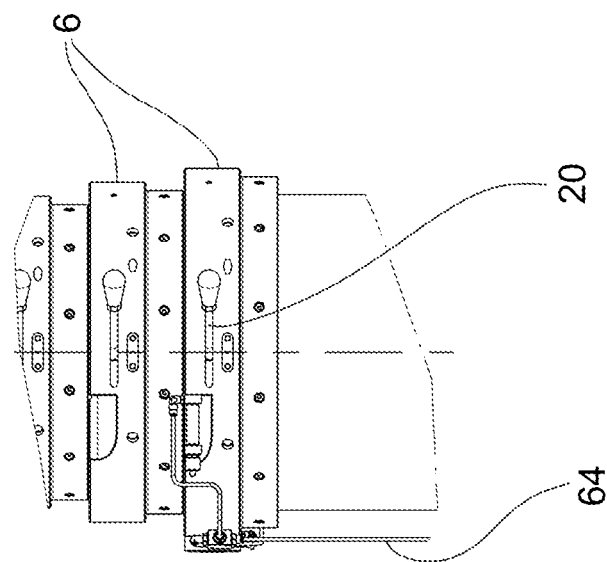
FIG. 2 is an enlarged view of the detail A circled in FIG. 1.
Figure 5:
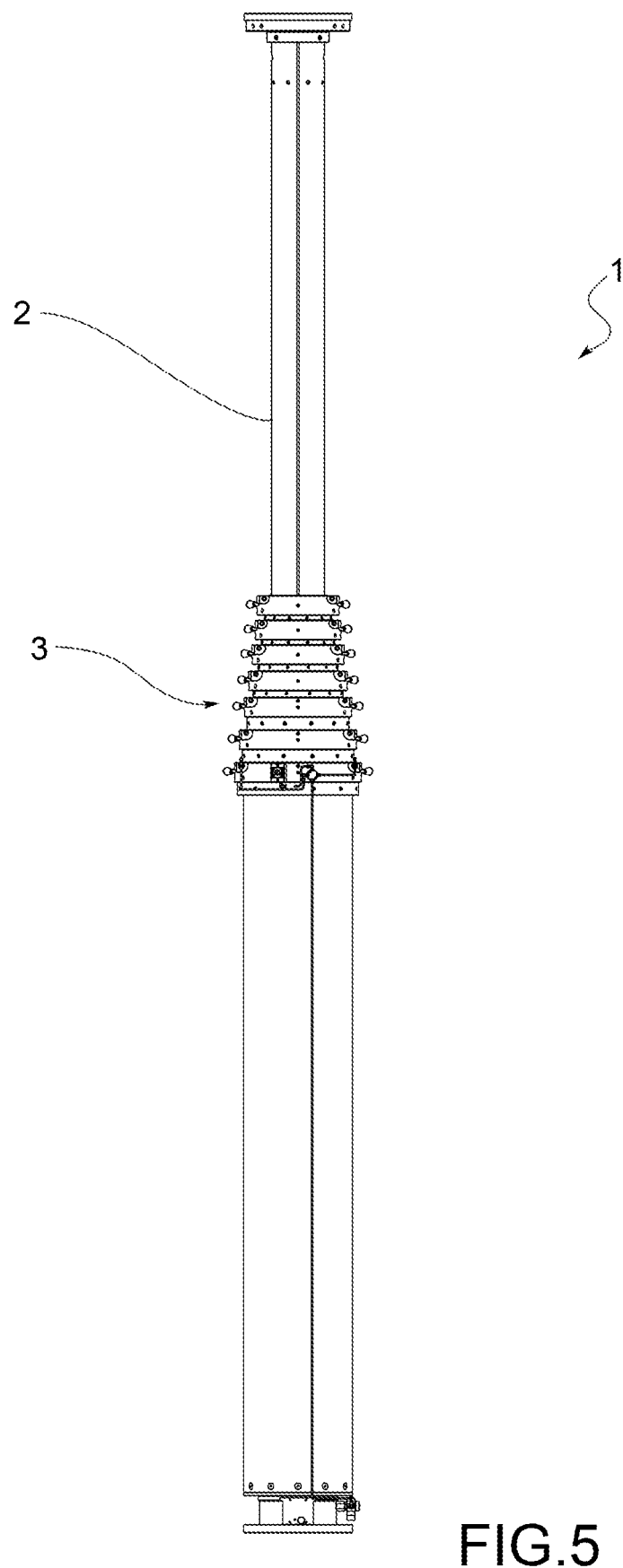
FIG. 5 is an elevation view of the partially extended mast.
Figure 6:
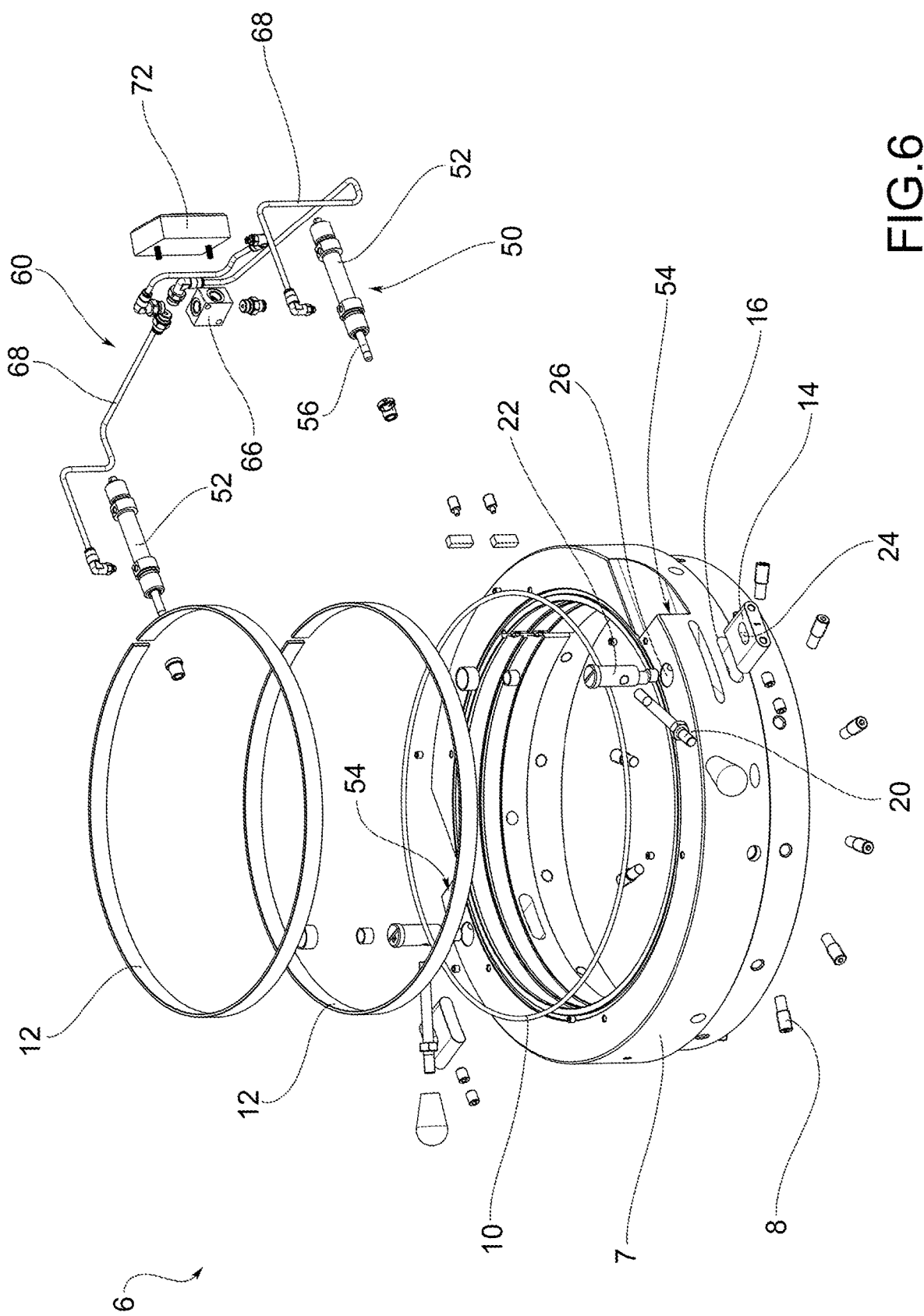
FIG. 6 is an exploded perspective view of the locking ring of the mast of the previous drawings.
Figure 7:
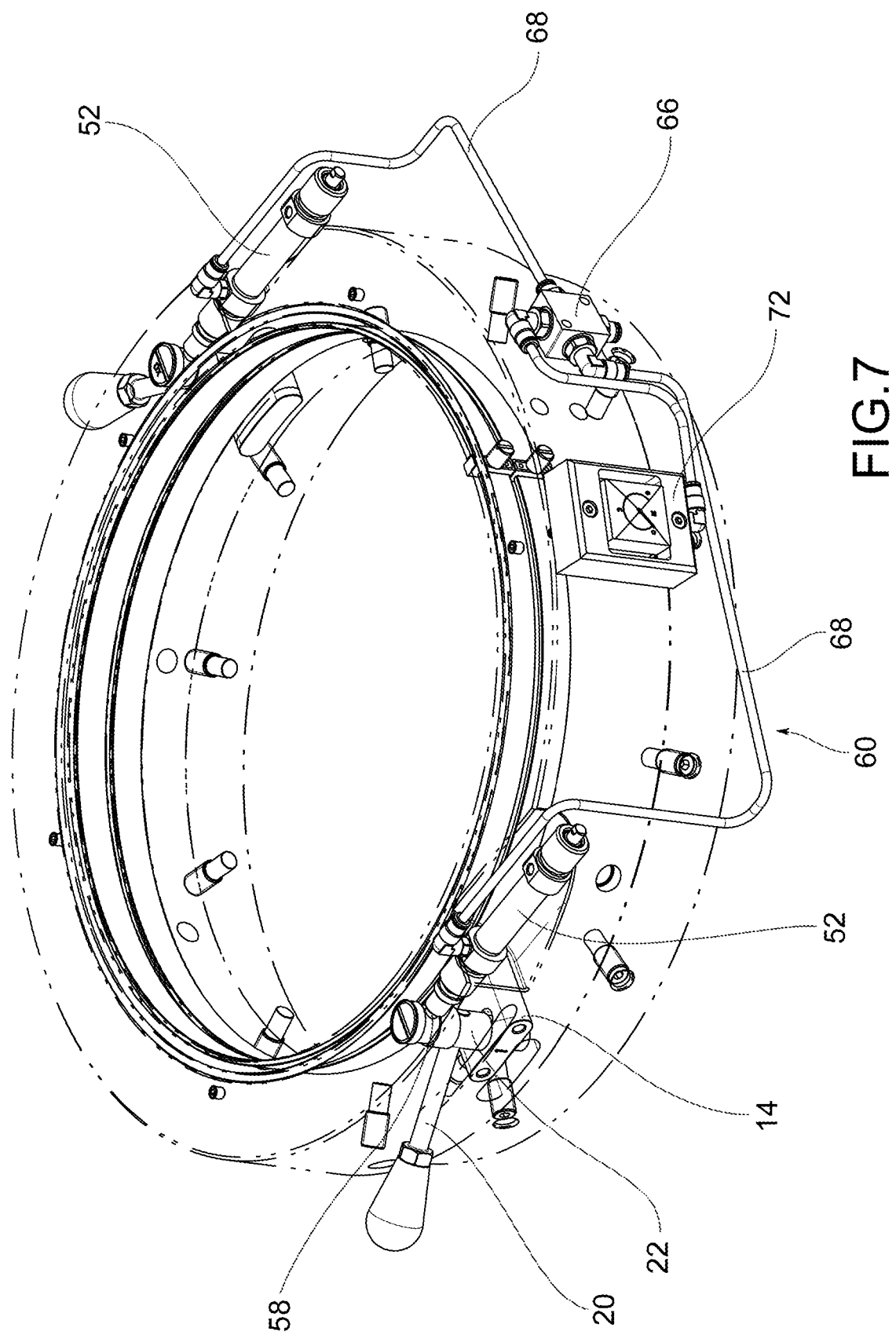
FIG. 7 is a perspective view of the assembled locking circle, with the ring structure shown in transparency so as to show the components of the locking device.
Figure 8:
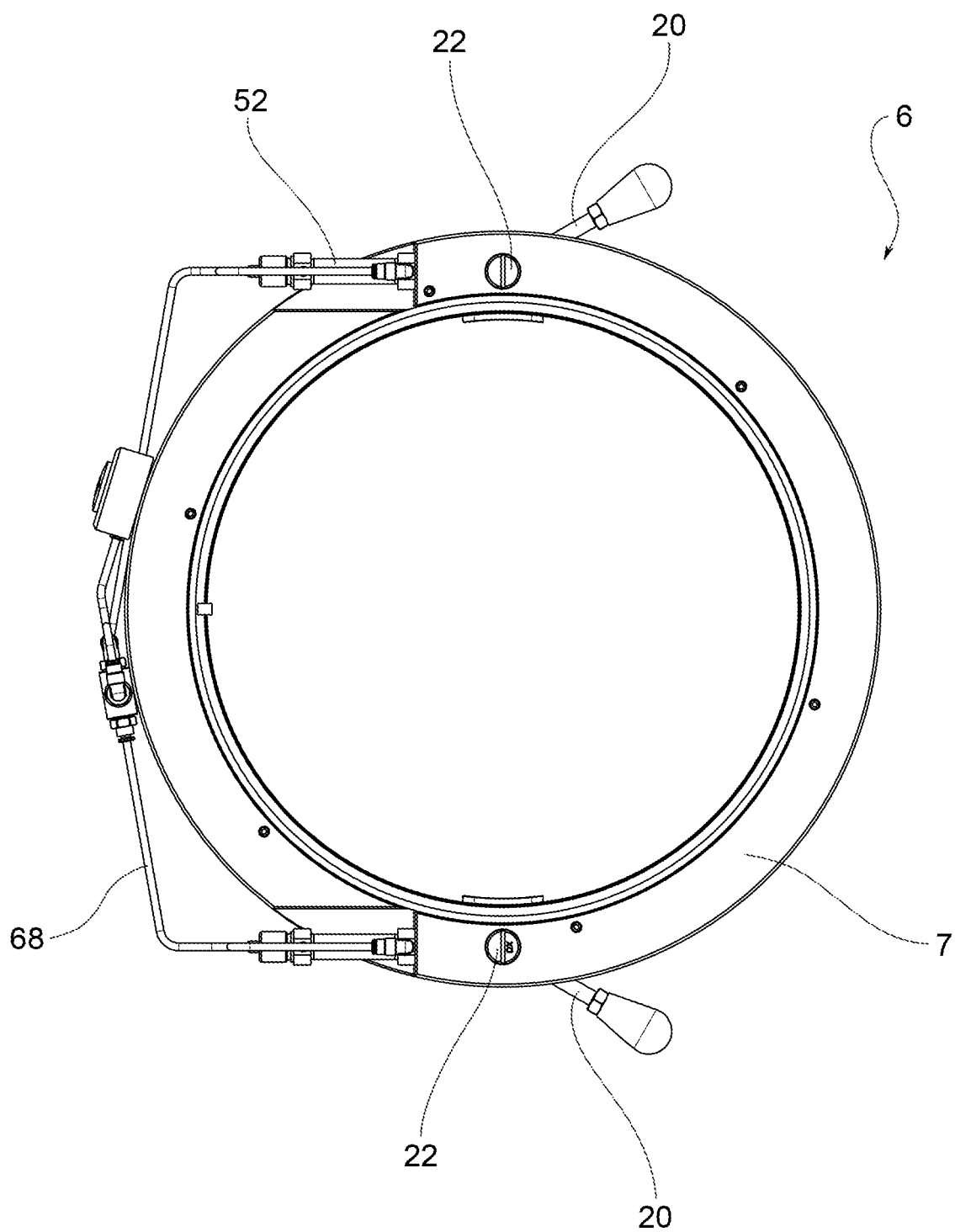
FIG. 8 is a top plan view of the locking ring.

In the drawings, elements which are common to the various embodiments are indicated by the same reference numerals.

Numeral 1 indicates a pneumatic telescoping mast according to the invention as a whole, for example for supporting and moving military communication, lighting and/or surveillance equipment. Mast 1 extends along a mast axis V-V and comprises a plurality of telescopically-coupled sealing tubes 2, 2'. The tubes 2, 2' are operable to switch from a retracted, or compact, mast configuration to an extended mast configuration, and vice versa. The actuation of the tubes 2, 2' occurs, in a known manner, by introducing pressurized air into the pneumatic telescoping mast 1.

Mast 1 is provided with tube locking means 3 suitable to lock the tubes 2 in the extended configuration by interference or friction even in the absence of pressurized air in mast 1.

In an embodiment, each tube 2, 2' is provided with tube locking means 3 which are operable to restrain and release the tube having a slightly smaller diameter (hereinbelow also defined "inner tube", it being accommodated, when the mast is compact, in the—outer—tube which supports the locking means restraining/releasing it). Thereby, when the pneumatic telescoping mast is in extended position, all the tube locking means 3 may be actuated so that each tube is integral with the tube having a slightly smaller diameter. The pressurized air may therefore be bled from the mast without the tubes being brought back to retracted position by gravity.

In certain embodiments, like that shown in the example depicted, the tube locking means 3 consist of radial latches 14 which are radially operable by translation between an advanced locked position of the tube having a slightly smaller diameter and a retracted released position.

According to an aspect of the invention, the tube locking means 3 are operatively connected to at least one safety device 50 configured to keep the tube locking means 3 in locked position and deactivatable to allow the tube locking means 3 to switch to the released position only when the air in mast 1 reaches a preset pressure value.

Referring now to FIGS. 1 to 13, a pneumatic telescoping mast 1 according to the invention is described in a first embodiment.

The pneumatic telescoping mast 1 comprises a fixed lower tube 2' provided, for example with a plate 4 for anchoring to a support surface, and a plurality of movable tubes 2. The movable tubes 2 have a progressively decreasing diameter. The movable tube 2 having a slightly smaller diameter than the fixed lower tube 2' is also defined as inner tube 2 or first movable tube 2.

The fixed lower tube 2' is provided, close to the upper end thereof, with a locking ring 6 suitable to engage the first movable tube 2 which, when the mast is in compact position as shown in FIGS. 1 and 1*a*, is accommodated in the fixed tube 2'.

This locking ring 6 comprises an annular body 7, for example fastened to the outer side surface of the fixed lower tube 2' by means of a plurality of fastening grub screws 8. The locking ring 6 is internally provided with an annular sealing element 10 and one or more guide bands 12 suitable to promote the translation of the first movable tube 2 with respect to the lower fixed tube 2'.

The locking ring 6 is provided with two radial locking latches 14 which are diametrically opposite to each other. Each latch 14 is slidingly inserted in a latch seat 16 thereof obtained in the annular body 7 of the locking ring 6. Each latch 14 is radially movable between an advanced locked position and a retracted, or inactive, released position of the first movable tube 2. When it is in advanced locked position, latch 14 radially protrudes from the inner wall of the locking ring 6 so as to engage a respective latch pocket obtained in the inner tube.

Each latch 14 is operable in translation by means of a manual control lever 20 which is integral with an eccentric locking pin 22 which engages a pin slot 24 obtained in latch 14. Therefore, a radial translation of the latch 14 corresponds to the rotation of the locking pin 22 about a pin axis thereof, for example parallel to the mast axis V-V.

In an embodiment, the locking pin 22 is accommodated in a pin seat 26 obtained in the annular body 7 of the locking ring.

Latch 14, the locking pin 22 and the control lever 20 form the tube locking means 3.

The rotation of the locking pin 22 is controlled by a safety device 50 which comprises a single acting cylinder 52 at least partially accommodated in a respective cylinder seat 54 obtained in the annular body 7 of the locking ring 6 and communicating, for example with the pin seat 26. The single acting cylinder 52 is provided with a stem 56 which is movable between an advanced locked position and a retracted released position. Cylinder 52 is normally stressed by an elastic element, for example a spring, which keeps stem 56 in advanced locked position. In this advanced locked position, stem 56 engages a radial hole 58 of the locking pin 22, preventing the rotation from the locked position to the locked position of the latch 14. Cylinder 52 may be fed with pressurized air so as to bring stem 56 in retracted position such as to release the locking pin 22 and allow the rotation thereof towards the released position, and therefore the retraction of the latch 14.

In an embodiment, the single acting cylinder 52 is fed by the pressurized air in the pneumatic telescoping mast 1. Stem 56 may therefore be brought into retracted position only when the pressure of the air in mast 1 reaches a preset threshold value.

In the embodiment shown in the drawings, it is worth noting that the two cylinders 52 are fed through a pneumatic circuit 60 in fluid communication with the interior of the telescoping mast 1.

For example, the pneumatic circuit 60 has an air inlet connection 62 connected to mast 1 and from which a supply tube 64 extends which rises from the base of the mast towards the locking ring 6 and, for example by means of a distributor 66 which distributes the inlet air towards two end ducts 68, brings the pressurized air to the two single acting cylinders 52. The supply circuit 60 may be provided with control devices such as a pressure limiting device 70 and a manometer 72.

FIGS. 9 and 9*a* show the locking ring 6 in a locked position of the inner tube 2, the pressure of the air in mast 1 being less than a preset value, for example of 1.3 bar. In this circumstance, the stem 56 of cylinder 52 is in advanced engaged position of the locking pin 22 and the control lever 20 cannot be rotated to bring latch 14 into inactive retracted position. Therefore, the inner tube 2 cannot move.

FIGS. 10, 10*a* show the locking ring 6 in a locked position of the inner tube 2, but with the stems 56 of the cylinders 52 in inactive retracted position, given that the pressure of the air in mast 1 is greater than the preset threshold value. Each control lever 20 is still in locked position, but it may be rotated into released position, in the direction of the arrows shown in FIG. 10.

FIGS. 11 and 11*a* show the locking ring 6 in released position of the inner tube 2. Here, the control levers 20 have been rotated into released position. The latches 14 were then brought into retracted position. Since the stems 56 of the cylinders 52 are in retracted disengaged position from the respective locking pins 22, each control lever 20 may be rotated in both directions. Obviously, the lever may be brought back into locked position only when latch 14 is at the related pocket of the inner tube 2. Therefore, the inner tube can be raised or lowered in this circumstance.

FIGS. 12 and 12*a* show the locking ring 6 in an intermediate configuration, typically following that of FIGS. 11, 11*a*, in which the pressure inside the mast is lower than the preset threshold value but the control levers 20 are in released position. In this circumstance, the stems 56 are partially advanced under the force of the elastic element not countered by the pressure of the air; they engage the locking pin 22 but without preventing the rotation thereof. When the latch pocket of the inner tube 2 is aligned with the respective latch 14, the latch may translate into advanced position and each stem 56 of cylinder 52 completely advances, thus locking the locking pin 22 in locked position.

It is worth noting that in the absence of air or an accidental breaking of the supply circuit of the single acting cylinders, such cylinders are brought into the locked position of the control levers, thus ensuring the safety of the mast.

As can be noted in FIGS. 1 to 5, each movable tube 2 is provided with a locking ring 6 similar to that described above. In the example shown, only the locking ring 6 of the fixed lower tube 2' is provided with the safety device 50 which controls the rotation of the control lever. However, such a safety device could also be applied to one or more of the further locking rings associated with the movable tubes.

Figure 13:
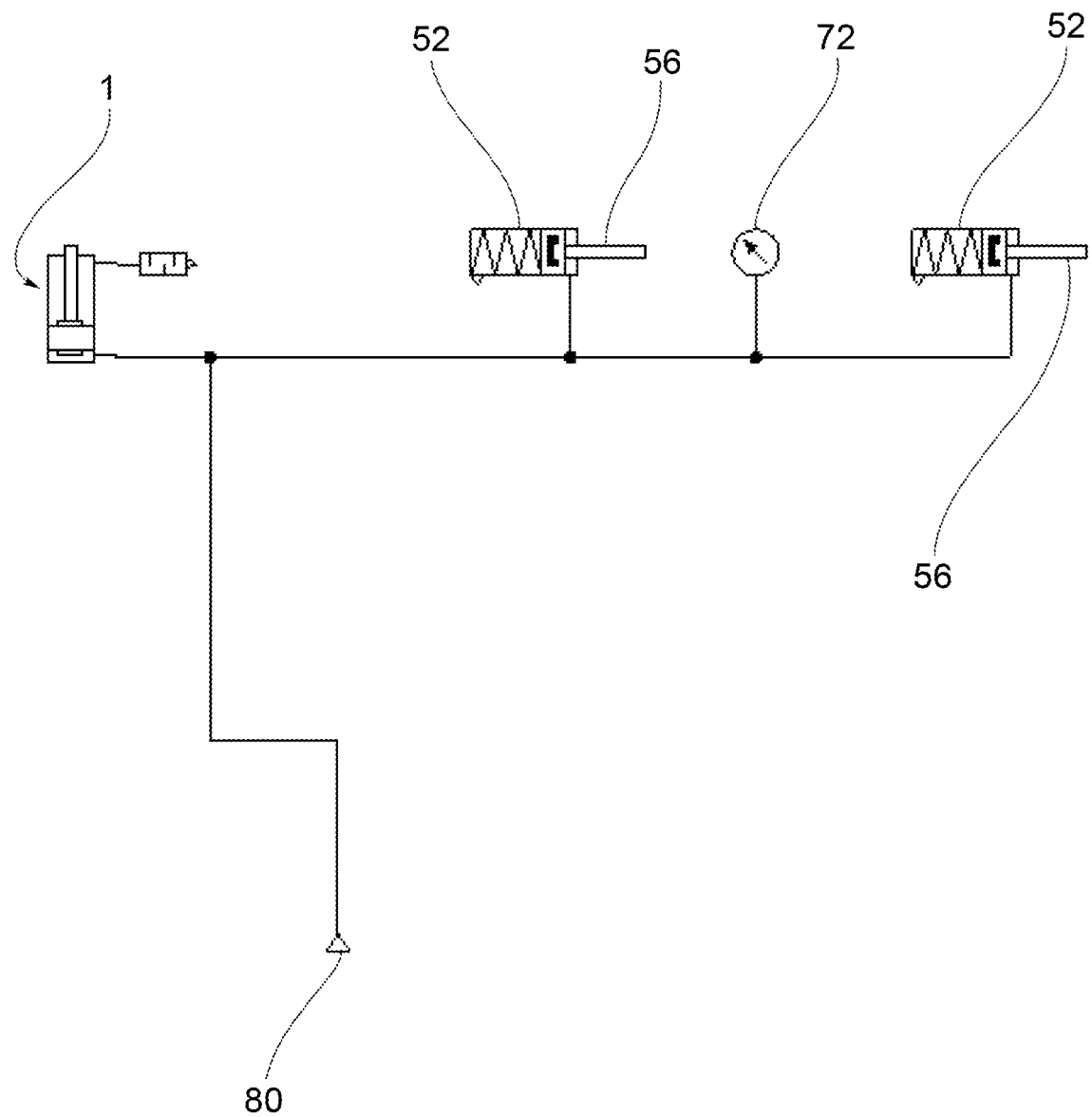
FIG. 13 is a pneumatic diagram of the locking ring.

FIG. 13 shows the pneumatic diagram of the telescoping mast 1, where it can be noted how a compressed air source 80, e.g. a compressor, supplies in parallel the tubes of mast 1 and the single acting pneumatic cylinders 52.

The operation of the mast is therefore as follows.

Air is introduced into the mast itself, in order to extend the mast. An operator releases the locking means of the mast, for example starting from the locking ring of the upper tube up to reaching the lower ones associated with the locking ring of the fixed lower tube. Once the preset pressure is reached, e.g. 1.3+/−0.15 bar, the single acting cylinder releases the locking pin, allowing the lever to bring the latch into retracted position to extend the inner tube.

In closing step of the mast, air is to be introduced into the mast up to reaching the opening pressure of the single acting cylinders, e.g. 1.3 bar. Once such a pressure value is reached, the stem of each cylinder is brought into retracted position, thus allowing the respective control lever to release the latch. Then, the mast may be closed by progressively bleeding air therefrom.

FIGS. 14 to 18 show a variant of a locking ring 600.

The overall structure of this locking ring 600 is similar to that of the above-described ring 6 but differs therefrom for the mode in which the safety device 650 is implemented.

As in the previous case, the locking ring 600 is provided with two diametrically opposite radial latches 14 which are movable between an advanced locked position, in which they engage respective latch pockets obtained in the first movable tube, and a retracted released position, in which they are disengaged from such pockets, thus allowing the translation of the first movable tube 2.

In this embodiment, each latch 14 is directly moved by a single acting cylinder 652 feedable with a pressurized fluid.

In a preferred embodiment shown in the drawings, the single acting cylinder 652 has a stem 656 connected, for example by screwing, to the respective latch 14.

The pressurized fluid may therefore be the same air supplied to the telescoping mast or, in an alternative embodiment, a fluid from another supply circuit of the pneumatic cylinder.

In any case, the single acting pneumatic cylinder 652 controls the retraction of the latch 14, overcoming the force of an elastic element 657 when the pressure of the control fluid exceeds a preset threshold value.

In an embodiment, the latch 14 and the pneumatic cylinder 652 are supported by a support plate 660 anchored to the annular body 607 of the locking ring 600.

As in the previous embodiment, the two diametrically opposite pneumatic cylinders 652 are fed in parallel through a supply circuit 60 which comprises a distributor 66 which receives the pressurized air from the compressed air source and distributes the air flow to the two cylinders 652 by means of end tubes 68.

Figure 14:
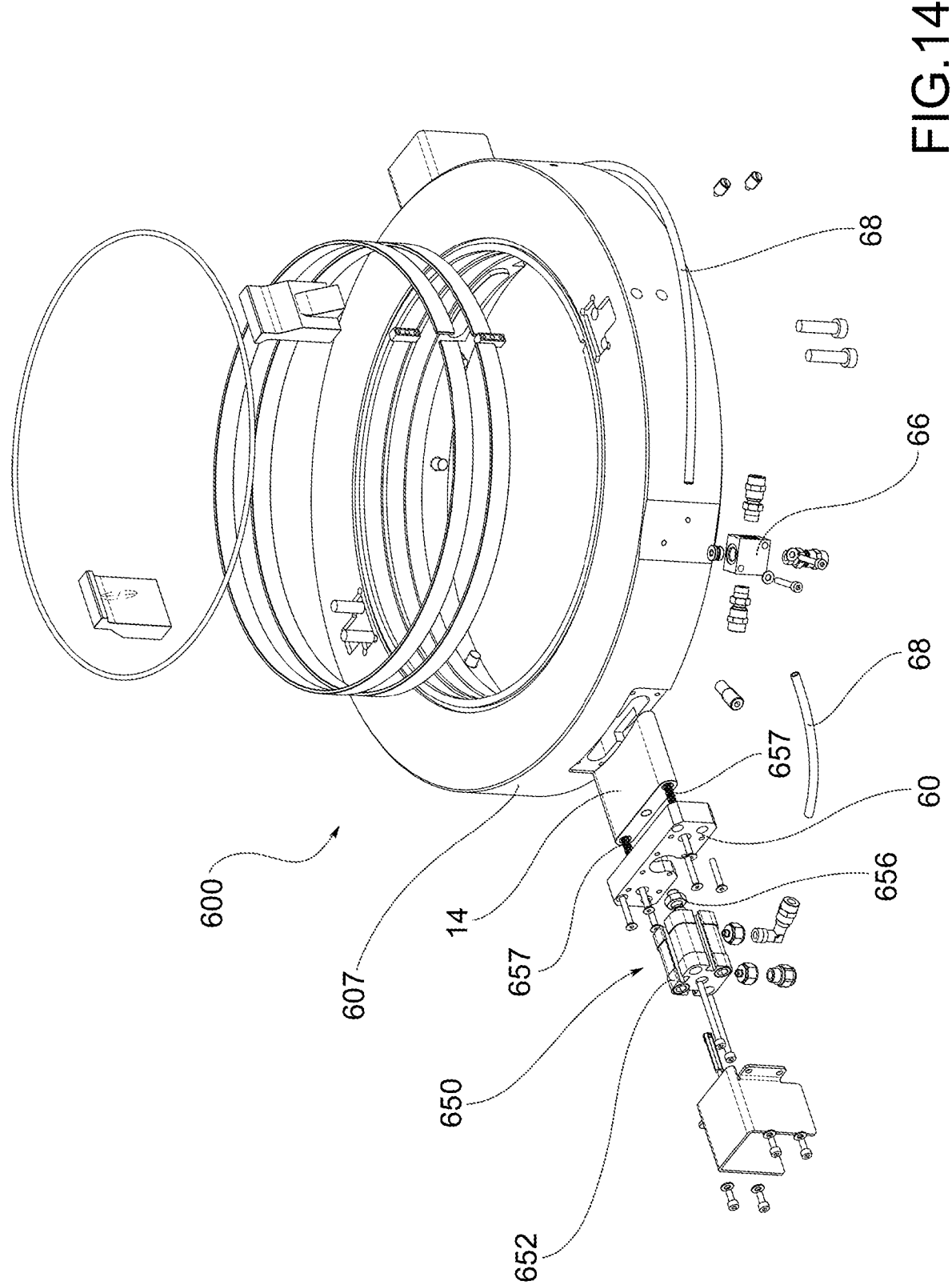
FIG. 14 is an exploded perspective view of a locking ring of a pneumatic telescoping mast in a variant.
Figure 18:
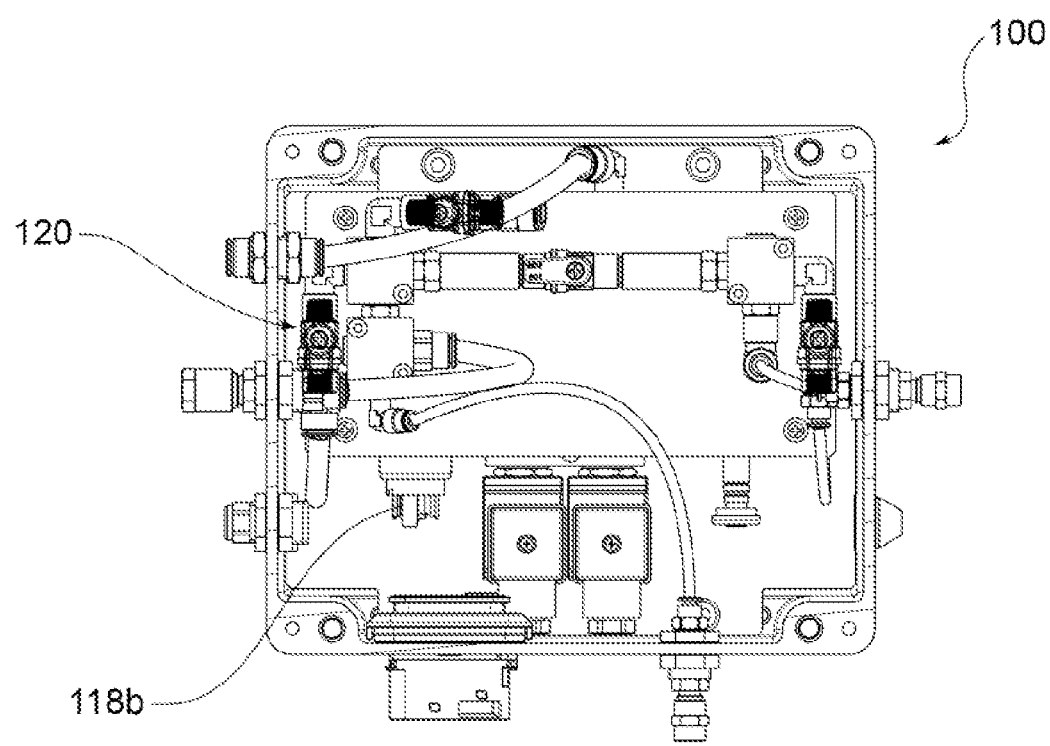
FIGS. 18 and 18*a* are a plan view and a sectional view of the electro-pneumatic control box of the pneumatic telescoping mast in FIGS. 14 to 17.
Figure 18A:
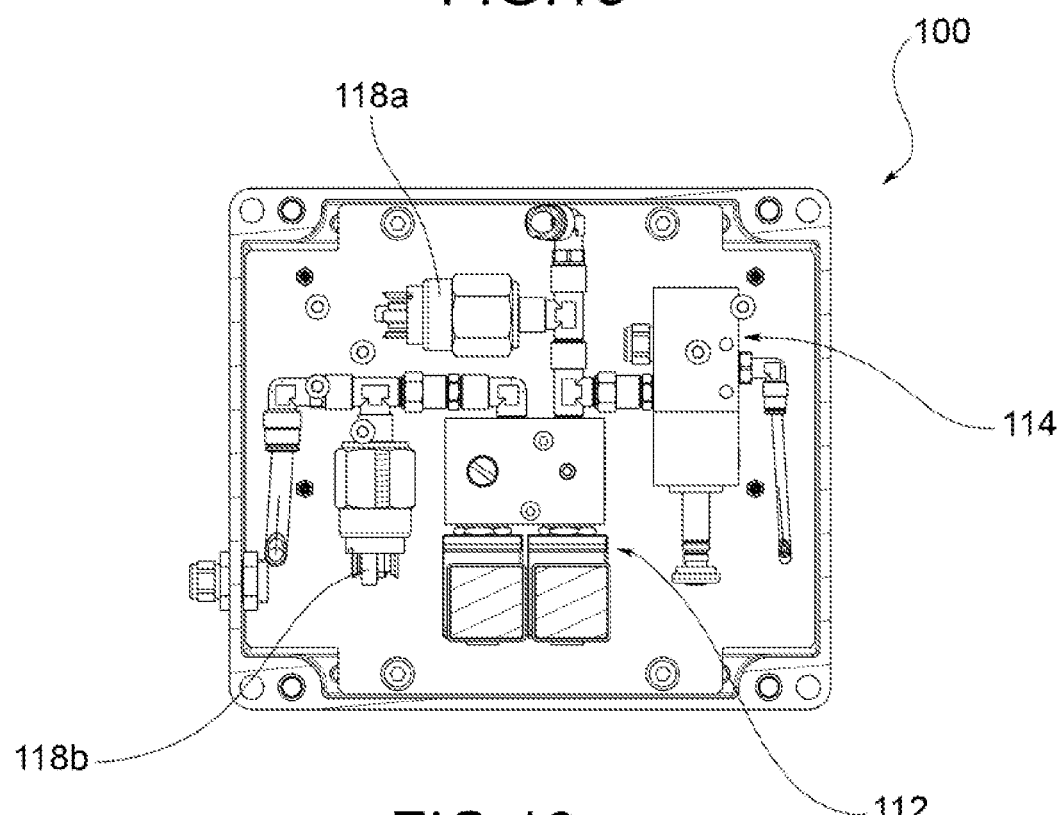

The elastic element 657 may be a spring accommodated in the pneumatic cylinder or, as in the example shown in FIG. 14, it may consist of a pair of compression springs interposed between latch 14 and the support plate 660 and which tend to keep the latch in advanced locked position. When the pneumatic cylinder 652 is supplied with a pressure of the control fluid which is equal to or greater than the preset threshold value, stem 656 is controlled to retract, overcoming the force of the elastic element and therefore moving latch 14 into the retracted released position.

In an embodiment, the telescoping mast 1 comprises an electric-pneumatic control box 100 which contains all the elements required to control the opening and closing of mast 1.

In particular, in the control box 100 there is a first solenoid valve 112 for controlling the loading and bleeding of the compressed air into and from mast 1, and a second solenoid valve 114 for controlling the opening and closing of the actuators 52; 652 which implement the safety devices.

The control box 100 further comprises a first pressure switch 118*a* suitable to check the presence of the network pressure, and a second pressure switch 118*b* suitable to detect the pressure in the chamber of the mast.

However, such a second pressure switch may alternatively also be installed directly at the base of the mast.

The control box 100 may further contain a pneumatic circuit 120, for example comprising manually operable valves, capable of allowing the safe retraction of the mast if the electric control is out of use due to damage or due to a lack of power supply.

The opening of mast 1 occurs by supplying pressurized air alone in the mast. The closing occurs by actuating the latches on the locking ring by means of a logic function. The logic function provides the consent of the opening of the latches, with the mast open, only if there is sufficient internal pressure to keep balanced the mast itself subject to the earth's gravitational action when the latches are retracted.

In an embodiment, the pneumatic telescoping mast 1 is also provided with a remote-control device 200 which acts as man-machine interface and which is operatively connected to the control box 100.

The remote-control device 200 includes an electronic control board of the solenoid valves 112, 114 in the electric-pneumatic control box 100. The electronic board implements a logic defined by the inputs provided by the pressure switches 118*a*, 118*b* and by proximity sensors on the actuators of the locking ring and by a limit switch on the ring itself.

Figure 19:
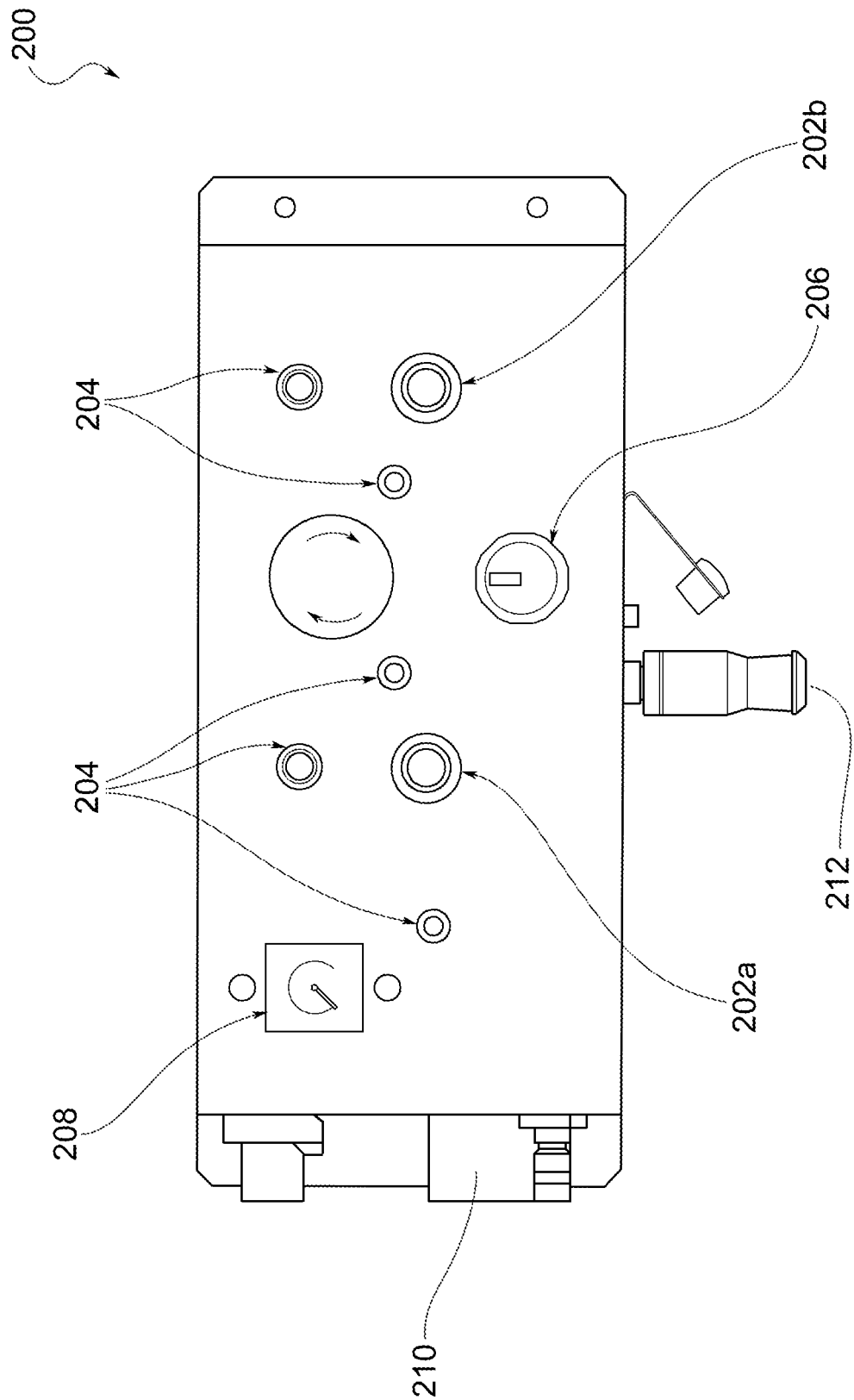
FIG. 19 shows a remote control device for controlling the pneumatic telescopic mast.

As shown in FIG. 19, the remote control device 200 is provided with buttons 202*a*, 202*b* for controlling the raising and lowering of the mast, light-signaling devices 204, a selector 206 for selecting the operating mode of the mast (automatic, manual, control OFF), a manometer 208 which indicates the pressure of the air in mast 1, a first electric connector 210 for communicating with the control box 100, and an optional second connector 212 which implements a protocol communication port 485.

As mentioned above, once extended, the pneumatic telescoping mast may remain open for an indefinite period of time. The mast may remain in such a configuration even in the absence of the whole control system.

In an embodiment, the operation of the telescoping mast in the lowering, i.e. closing, step provides the following actions.

The operator turns the remote electric-pneumatic control 200 to automatic or manual mode and presses the lowering button 202*b*.

If the pressure switch 118*b* detects there is sufficient pressurized air in the mast, the mast lowers. The button may be released in automatic mode. The button is to be kept pressed down in manual mode.

The mast does not lower if the air in the mast is not sufficiently pressurized because the safety devices remain actuated. Under such a condition, one of the light-signaling devices 204 close to manometer 208 turns on red.

The operator may press the raise button 202*a* so that the mast is filled with air until the minimum preset pressure is reached. For example, a signaling device close to the raise button may flash to suggest the operator perform this action.

When the mast has reached the preset pressure—a condition that may be signaled by the lighting up of a signaling device—the safety devices are deactivated and, by pressing the lowering button 202*b* again, the mast begins bleeding air, thus allowing the lowering step.

In further embodiments, pressure transducers which check the pressure level of the air in the mast may be used and, for example they may allow or refuse the release of the locking means through suitable control logics.

The transducers, logic ports and locking means may be made with pneumatic, electric, hydraulic, mechanical devices, or combinations of these technologies.

The safety system described may further comprise a man-machine interface which shows the operator the state of the pressure in the mast so as to suggest the operations for the operator him/herself to carry out in order to.

In all the embodiments, if the mast is not pressurized at a preset level beforehand, the locking means of the mast, e.g. the latches, cannot be deactivated when the mast is extended.

It is thus apparent how the pneumatic telescoping mast described is capable of achieving the object of preventing an accidental deactivation of the locking means when there is not sufficient pressure in the mast to cause the tubes to remain in the extracted position.

Those skilled in the art may make several changes and adaptations to the above-described embodiments of the pneumatic telescoping mast according to the invention, and may replace elements with others which are functionally equivalent in order to meet contingent needs, without departing from the scope of protection of the following claims. Each of the features described as belonging to a possible embodiment can be achieved irrespective of the other embodiments described.

The invention claimed is:

1. A pneumatic telescoping mast, comprising a plurality of telescopically-coupled sealing tubes, the telescopically-coupled sealing tubes being operable to switch from a retracted configuration to an extended configuration, and vice versa, wherein actuation of the telescopically-coupled sealing tubes occurs by introducing pressurized air into the pneumatic telescoping mast, tube locking means suitable for locking the telescopically-coupled sealing tubes in the extended configuration by interference or friction even in absence of the pressurized air in the pneumatic telescoping mast, wherein the tube locking means comprise at least one safety device configured to keep the tube locking means in a locked position, the at least one safety device being deactivatable to allow the tube locking means to switch to a released position only when air in the pneumatic telescoping mast reaches a preset pressure threshold, wherein, when the air inside the pneumatic telescoping mast reaches the preset pressure threshold, a manual control member operatively connected to at least one latch becomes operable, and wherein the at least one safety device is operable by the pressurized air in the pneumatic telescoping mast, wherein the tube locking means comprise at least one latch radially movable between an inactive retracted position and an active advanced position, and wherein the at least one latch engages a latch pocket formed in a tube of the plurality of telescopically-coupled sealing tubes having a smaller diameter than that of the tube of the plurality of telescopically-coupled sealing tubes supporting the latch, and wherein movement of the at least one latch is caused by actuation of the manual control member operatively connected to the at least one latch, and wherein the at least one safety device comprises a single acting cylinder normally biased by at least one elastic element to prevent actuation of the manual control member and operable by the pressurized air in the pneumatic telescoping mast to be disengaged from the manual control member.

2. The pneumatic telescoping mast of claim 1, wherein the manual control member comprises an eccentric locking pin that is integral with a control lever and engages a slot of the at least one latch, a locking hole being formed in the eccentric locking pin, engageable by a stem of the single acting cylinder to lock a rotation of the eccentric locking pin.

3. The pneumatic telescoping mast of claim 1, wherein movement of the at least one latch is caused by a single acting cylinder operable with a pressurized fluid to bring the at least one latch from the active advanced position to the inactive retracted position.

4. The pneumatic telescoping mast of claim 3, wherein the single acting cylinder is operable by the pressurized air in the pneumatic telescoping mast.

5. The pneumatic telescoping mast of claim 3, comprising a pressure switch suitable for detecting pressure value of air in the pneumatic telescoping mast, the single acting cylinder being operable by a driving circuit that powers the single acting cylinder when the pressure switch detects reaching of the preset pressure threshold.

6. The pneumatic telescoping mast of claim 1, wherein the plurality of telescopically-coupled sealing tubes comprises a fixed base tube, the at least one safety device being supported by a locking ring fastened at an upper end of the fixed base tube.

7. The pneumatic telescoping mast of claim 1, wherein the pneumatic telescoping mast is suitable for supporting and moving military communication, lighting and/or surveillance equipment.

* * * * *